(12) United States Patent
Koenitzer et al.

(10) Patent No.: US 12,482,610 B2
(45) Date of Patent: Nov. 25, 2025

(54) METHOD OF PRODUCING A TANTALUM CAPACITOR ANODE

(71) Applicant: KEMET Electronics Corporation, Fort Lauderdale, FL (US)

(72) Inventors: John W. Koenitzer, Simpsonville, SC (US); Javaid I. Qazi, Simpsonville, SC (US)

(73) Assignee: KEMET Electronics Corporation, Fort Lauderdale, FL (US)

(*) Notice: Subject to any disclaimer, the term of this patent is extended or adjusted under 35 U.S.C. 154(b) by 290 days.

(21) Appl. No.: 18/201,451

(22) Filed: May 24, 2023

(65) Prior Publication Data

US 2023/0395329 A1 Dec. 7, 2023

Related U.S. Application Data

(60) Provisional application No. 63/348,095, filed on Jun. 2, 2022.

(51) Int. Cl.
*H01G 9/052* (2006.01)
*H01G 9/042* (2006.01)
*H01G 9/04* (2006.01)

(52) U.S. Cl.
CPC .......... *H01G 9/0525* (2013.01); *H01G 9/042* (2013.01); *H01G 2009/05* (2013.01)

(58) Field of Classification Search
CPC .. H01G 9/0525; H01G 9/042; H01G 2009/05; H01G 9/0029; H01G 9/15; H01G 9/052; Y10T 29/417; Y10T 29/49204; Y10T 29/49206
See application file for complete search history.

(56) References Cited

U.S. PATENT DOCUMENTS

| | | | |
|---|---|---|---|
| 4,722,756 A | 2/1988 | Hard | |
| 6,447,570 B1 | 9/2002 | Pozdeev-Freeman | |
| 6,479,012 B2 * | 11/2002 | Rao | H01G 9/0525 419/36 |
| 7,666,247 B2 * | 2/2010 | He | H01G 9/0525 419/30 |
| 7,852,615 B2 * | 12/2010 | Breznova | H01G 9/052 29/25.03 |
| 2008/0106852 A1 | 5/2008 | Amita et al. | |

* cited by examiner

*Primary Examiner* — Donghai D Nguyen
(74) *Attorney, Agent, or Firm* — Joseph T. Guy; Patent Filing Specialist Inc.

(57) ABSTRACT

An improved process for forming powder, an anode of the powder and a capacitor comprising the powder is provided. The process comprises forming a dense aggregate comprising a powder and solvent in a pendular, funicular or capillary state and freeze drying the powder comprising high surface area.

56 Claims, 9 Drawing Sheets

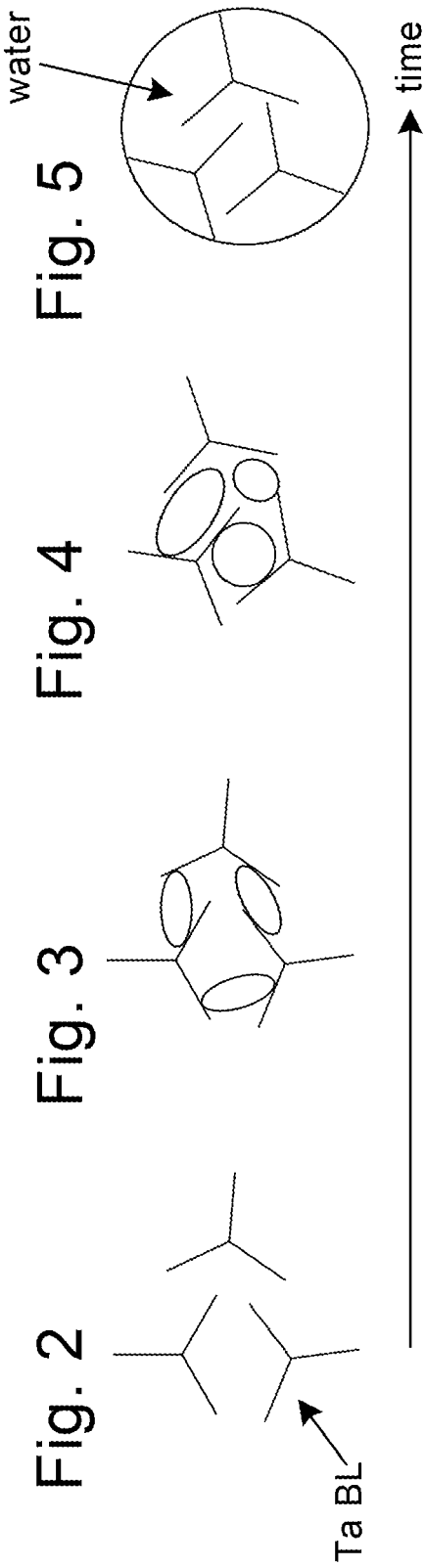

METHOD OF PRODUCING A TANTALUM CAPACITOR ANODE

CROSS-REFERENCE TO RELATED APPLICATIONS

The present invention claims priority to U.S. Provisional Application No. 63/348,095 filed Jun. 2, 2022 which is incorporated herein by reference.

FIELD OF THE INVENTION

The present invention is related to an improved method for forming tantalum powder anodes for use in capacitors. More specifically, the present invention is related to an improved method for forming an anode comprising freeze drying and directional freezing techniques for improved performance.

BACKGROUND

The demand for electronic components with ever increasing functionality has been ongoing for decades. The demand for functionality has been complicated by the parallel desire for smaller devices resulting in contradictory demands for higher functionality and smaller volume. These competing trends have led to an ever-increasing pressure on component manufacturers to provide smaller components without sacrificing functionality. For the purposes of the present invention the competing desire for increased functionality in a smaller volume has resulted in significant advances in capacitors and, particularly, tantalum-based capacitors.

Tantalum-based capacitors typically comprise a sintered monolith of pressed tantalum powder. A dielectric is formed on the monolith and a cathode is formed on the dielectric. An important aspect of the capacitance, or charge density, of the capacitor is the nature of the powder with increased surface area being desirable. There is an ongoing desire for tantalum capacitors which can be formed without pressing the powder to form a monolith.

High surface area tantalum is desirable as an anode material for capacitors because of the direct relationship between capacitance and surface area. The surface area needs to be conserved during the various processing steps such as drying, agglomeration and sintering. Sintering creates challenges due to various mass transport effects, diffusion effects and surface tension effects which occur during these processing steps. The removal of solvents from solid particles, typically in the form of a slurry, is often done using conventional evaporative drying methods where the solid/liquid mixture is heated to temperatures near that of the evaporation temperature of the solvent.

In the conventional process of forming tantalum anodes potassium tantalum fluoride is reduced in sodium followed by reaction with fluoride salts to obtain a powder referred to in the art as a tantalum basic lot powder having a density of about 0.7 to 1.0 g/cc. The basic lot powder is agglomerated by various techniques to form an agglomerated powder. The agglomerated powder is then sintered, to achieve adequate flow characteristics resulting in an aggregated powder. The aggregated powder is then deoxygenated, with magnesium to form an aggregated finished lot powder having a density of about 1.5-2.0 g/cc. The finished lot powder is blended with binder, pressed to a density of about 5.8 to 7.5 g/cc, preferably, 6.2 to 6.6 g/cc resulting in a green tantalum anode. The green tantalum anode is heated to remove binder, sintered and can be Mg deoxygenated again. Each step of deoxygenation, sintering, pressing, etc. is contrary to the desire of achieving a high surface area since the primary particle diameter grows in size with the pores being irreversibly collapsed.

A novel method of forming tantalum powder has been developed which results in a significant increase in surface area and the resulting powder can be formed into an anode without pressing even though the improved powder can be pressed if desired.

SUMMARY OF THE INVENTION

The present invention is related to an improved method for forming tantalum powder and an improved powder formed by the method.

More specifically, the present invention is related to the formation of an anode which is suitable for use in a capacitor.

A particular feature of the invention is the ability to form an anode without pressing.

Yet another particular feature is the ability to form an anode, and a capacitor comprising the anode, with improved electrical properties.

These and other embodiments, as will be realized, are provided in a process for forming an anode. The process comprises:
 forming a dense aggregate comprising a powder and solvent in a pendular, funicular or capillary state;
 forming the dense aggregate into an anode shape;
 freeze drying the anode shape to form an anode precursor; and
 sintering the anode precursor to form an anode.

Yet another embodiment is provided in an anode, and a capacitor having an anode, wherein the anode has a porous 3-D shape wherein the porous 3-D structure comprising dendritic voids.

Yet another embodiment is provided in a process for forming an anode comprising:
 forming a dense aggregate comprising a powder and solvent in a pendular, funicular or capillary state;
 freeze drying the dense aggregate to form a dried powder;
 forming the dried powder into an anode precursor; and
 sintering the anode precursor to form an anode.

Yet another embodiment is provided in a process for forming anode. The process comprises:
 providing a basic lot powder having a density of 0.7 to 1 g/cc;
 converting the basic lot powder to a dense aggregate comprising a powder and solvent in a pendular, funicular or capillary state having a density of at least 4 g/cc;
 forming the dense aggregate into an anode shape;
 drying the anode shape to form an anode precursor; and
 sintering the anode precursor to form an anode having a density of 6.0 to 7.5 g/cc.

BRIEF DESCRIPTION OF DRAWINGS

FIGS. 2-5 schematically illustrate dense aggregate formation.

DESCRIPTION

The present invention is related to an improved tantalum powder, and method of forming improved tantalum powders, and capacitors comprising anodes formed from the tantalum powders wherein the powder is formed using vacuum drying, preferably freeze drying, and directional freezing techniques. The use of the drying and directional freezing techniques provides improvements in surface area and therefore improvements in electrical performance.

The invention will be described with reference to the figures forming an integral, non-limiting, component of the disclosure. Throughout the various figures similar elements will be numbered accordingly.

Figure 1:
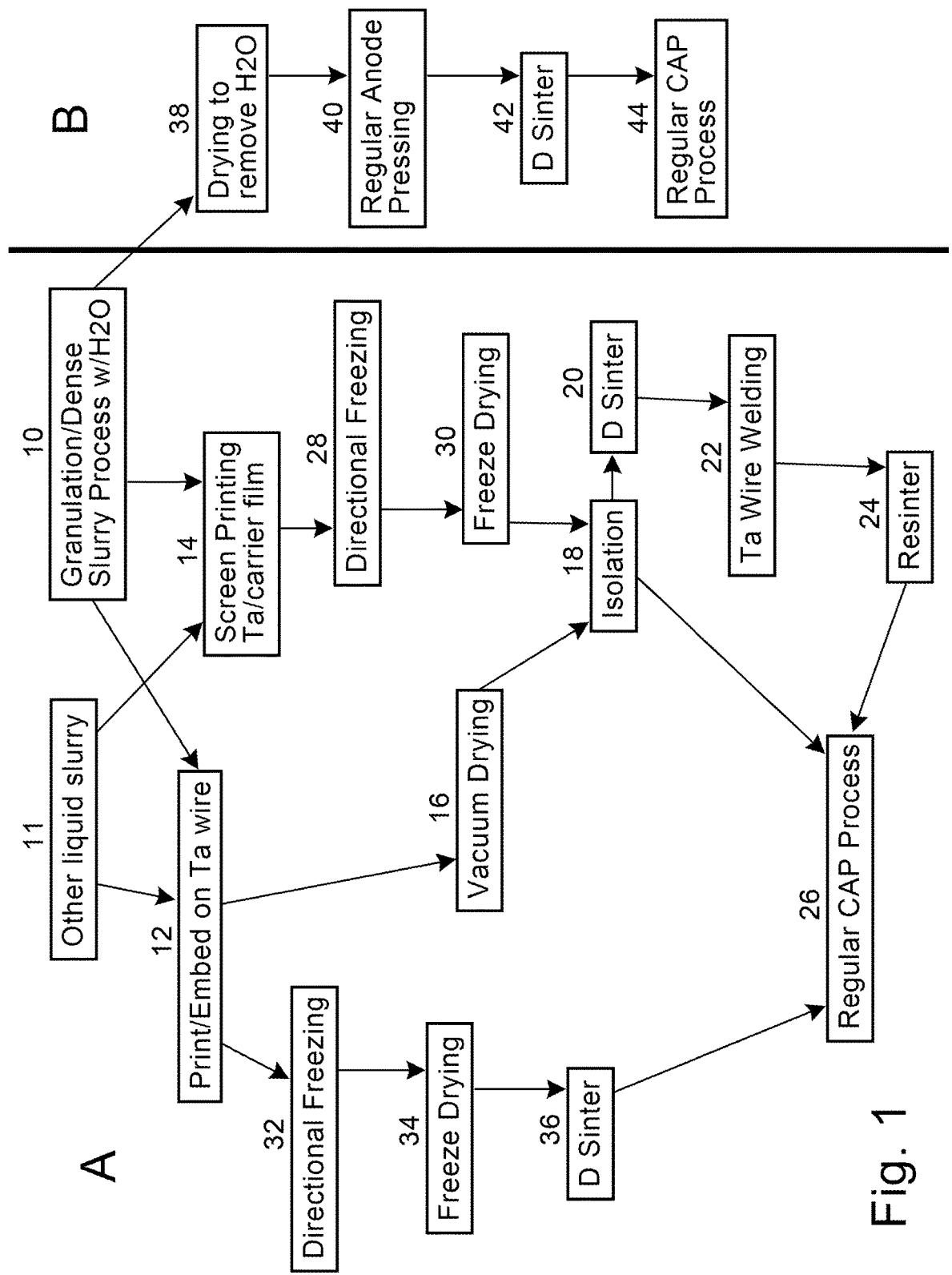
FIG. 1 is a flow-chart representation of the invention.

An embodiment of the invention will be described with reference to FIG. 1. In FIG. 1 the process for forming tantalum powder is illustrated in a flow chart. In FIG. 1, an agglomeration and anode making process is illustrated in Section A and an alternative agglomeration process is illustrated in Section B.

With reference to Section A of FIG. 1, a granulation and densification process for forming a slurry with water is indicated at 10 wherein dense aggregates are formed from basic lot wherein the dense aggregates preferably have a density of about 3.0 to 4 g/cc. Other methods for forming a liquid slurry can be incorporated at 11 with the granulation and densification process described herein being preferred. The properties of the dense aggregates are suitable for connecting with a tantalum wire at 12 using printing techniques wherein the dense aggregate is printed onto a substrate comprising a wire or by embedding the tantalum wire in the dense aggregate thereby forming a wired aggregate. Alternatively, the dense aggregate can be screen printed at 14 to form a printed aggregate. Either the wired aggregate or the printed aggregate can be vacuum dried at 16 followed by isolation at 18 to form an isolated powder. The isolated powder can be formed into an anode and deoxidized, referred to as being "D Sintered" at 20 to form a deoxidized anode. A tantalum wire is attached to the anode, such as by welding at 22, followed by resintering at 24 followed by the typical process of forming a capacitor at 26 including forming the dielectric on the anode and the cathode on the dielectric.

With continued attention to Section A of FIG. 1 the printed aggregate can be subjected to directional freezing at 28 wherein ice zones are created in the form of dendrites within the powder similar to the formation of an icicle. Upon freeze drying at 30 the ice zones are vacated by sublimation of the water resulting in dendritic voids or pores within the printed aggregate resulting in a printed aggregate with increased surface area. The printed aggregate, now comprising increased surface area, is then isolated at 18 and treated as discussed above.

With continued attention to Section A of FIG. 1 the wired aggregate can be formed into the desired shape followed by being subjected to directional freezing at 32 wherein ice zones are created within the powder similar to the formation of an icicle. Upon freeze drying at 34 the ice zones are removed by sublimation of the water resulting in dendritic voids or pores, which are essentially replicas of the ice zones, within the printed aggregate. The formation of the dendritic voids or pores in a printed aggregate significantly increases the surface area. The wired aggregate, now comprising increased surface area, is then deoxidized at 36 followed by the typical process of forming a capacitor at 26 including forming the dielectric on the anode and the cathode on the dielectric.

With reference to Section B of FIG. 1, the dense aggregate can be dried at 38 followed by the formation of a monolith by anode pressing at 40. After formation the monolith can be deoxygenated at 42 followed by the typical process of forming a capacitor at 44 including forming the dielectric on the anode and the cathode on the dielectric.

Figure 12:
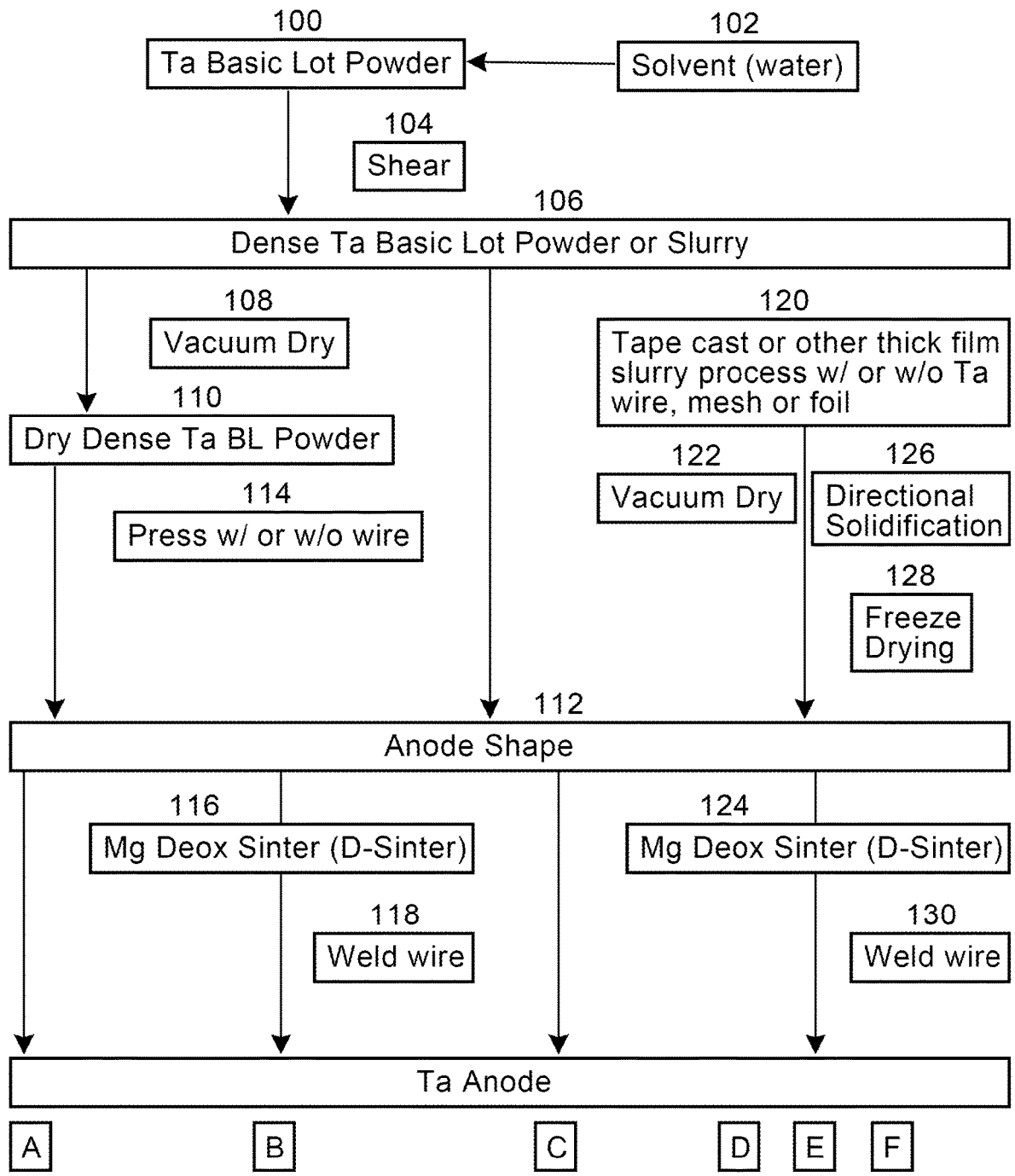
FIG. 12 is a flow-chart representation of the invention.

An alternative embodiment will be described with reference to FIG. 12 wherein the process of forming an anode is illustrated in a flow chart. In FIG. 12, a basic lot tantalum powder, 100, having a density of about 0.7 to 1 g/cc is mixed with water, 102, with shear, 104, to form a dense aggregate, 106, also referred to as a dense tantalum lot powder or slurry. The dense aggregate is dried, 108, by vacuum drying, and preferably freeze drying, resulting in a dry dense aggregate, 110. A particular advantage of the invention is the absence of powder sintering and deoxidation required prior to formation of anode shape, 112, wherein the anode shape is formed by pressing with a wire or without a wire at 114. The shaped anode, with a wire, is deoxygenated at 116 resulting in anode A. The anode without the wire is deoxygenated at 116 followed by attaching an anode wire such as by welding at 118 resulting in anode B. Alternatively, the dense aggregate can be cast at 120 and vacuum dried at 122, optionally freeze dried, to form an anode shape, at 112 with or without an anode wire embedded therein. The dense aggregate can be cast by methods such as by tape casting, or other film forming techniques. The anode shape is deoxygenated at 124 resulting in anode C with a wire or a wire is attached at 130 resulting in anode D. Alternatively, the cast anode can be directionally solidified at 126 to alter the porosity followed by freeze drying at 128 resulting in the anode shape at 112. The anode shape is them deoxygenated at 124 resulting in anode E with a wire or a wire is attached at 130 resulting in anode F.

The dense aggregates, and formation thereof, will be described with reference to FIGS. 2-5 wherein the formation of the dense aggregate is illustrated schematically. FIG. 2 schematically illustrates a dry powder, also referred to as a basic lot powder, which does not readily flow. The dry powder typically has a density of about 0.7 to 1 g/cc which is well below the desired density of above 3.0 g/cc. Solvent, preferably water, is added to the dry powder under high sheer conditions. As the water is added, with sheer, hydrogen bonding causes the water to enter the interstitial space between the particles as illustrated schematically in FIG. 3, referred to as the pendular state, wherein the particles are held together by lens-shaped rings of liquid but the interstitial space between particles is still primarily air. With increased water and sheer the more air, but not all of the air, is displaced from the interstitial space by the water, referred to as the funicular state as illustrated schematically in FIG. 4. With continued water addition and sheer the capillary state is achieved as illustrated schematically in FIG. 5 where all of the interstitial air has been displaced by water. With increased water the density increases as does the aggregation resulting in larger particles. Controlling the amount of water and sheer allows for control of the Scott density and intra-agglomerate pore structure. Lower water and higher sheer results in a higher density agglomerates with less porosity.

Isolation, to obtain the isolated powder, is preferably accomplished by screening. Screening to obtain powder with particle sizes between a 100 mesh to 200 mesh is suitable for demonstration of the invention. For the purposes of the disclosure a powder designated as a negative mesh size indicates powder having a size sufficient to pass through the screen. For example, a powder represented as −40 mesh passed through a 40 mesh screen whereas a powder represented as +40 mesh is powder that was oversized relative to a 40 mesh screen and therefore remains on the screen. A designation such as −100 mesh to +200 mesh indicates a powder with a size suitable to go through a 100 mesh screen but not through a 200 mesh screen and therefore the powder has a defined range of powder sizes.

It is preferable to remove oxygen in a deoxygenation step also referred to herein as "D Sinter", wherein either dissolved oxygen or oxygen as a metal oxide, are removed from the powder. The oxygen is preferably removed by magnesium. In the deoxidation or leaching process the powder is loaded into a vacuum furnace with an appropriate amount of Mg. The furnace is heated to a temperature sufficient to vaporize the Mg and the temperature is maintained until available oxygen is interacted with Mg and form MgO. In an exemplary embodiment about 6 gms of Mg is sufficient to deoxidize about 453 to 680 g of tantalum material in about 3 hrs at about 1000° C. The material is then leached to remove MgO residue.

The leaching process completes the formation of the native oxide layer while removing any hydrogen produced. This also removes the MgO in the deoxidized valve metal materials. Leaching can be accomplished in an aqueous mineral acid. A particularly suitable wash solution for removing MgO is a dilute aqueous solution of sulfuric acid and hydrogen peroxide.

In the leaching process deoxidized powder is washed with leach solution such as a mixture of hydrogen peroxide and sulfuric acid in a concentration sufficient to leach the magnesium oxide in the desired time. As would be realized to those of skill in the art a wide range of hydrogen peroxide and sulfuric acid can be used with more highly concentrated solutions being more rapid. By way of example, without limit thereto, an aqueous solution comprising about 11.3 vol % of $H_2O_2$, 35% concentrated, and 4.7 vol % $H_2SO_4$, 98% concentrated, is mixed with 84 vol % deionized DI water and held for about 4 hours. In some embodiments, more aggressive leach solutions such as 50 Vol % $HNO_3$, 68% concentrated, and 50 vol % of deionized water can be used. The leached parts are then washed thoroughly and dried in an oven preferably at about 85° C. until the parts are dry. A second leaching can be performed if desired.

After removal of the MgO the powder is dried by conventional techniques, screened and packaged in a manner suitable for transport or for transfer to the pressing operation. Conventional atmospheric drying is appropriate at this stage of processing because the thermal processing steps of heat treatment and magnesium deoxidation have metallurgically stabilized the powder.

A particular feature of the inventive powder is the flowing characteristics measured as grams of powder flowing through a funnel per second. For the instant invention flow can be measured in a Hall Flow Meter with a calibrated Hall Flow Funnel having an orifice diameter of 0.2 inch. A non-vibrated flow of at least 1 g/s is a relatively free flowing powder. Flow is preferably at least 2 g/s, more preferably at least 3 g/s and even more preferably at least 4 g/s. Flow typically does not exceed 8 g/s with the desirable particle size ranges.

The powder can be formed into a desired 3-dimensional, or 3-D, shape to form an anode precursor wherein the desired 3-dimensional shape can be a monolith or a coating. If a monolith is desirable it is preferable to form the monolith prior to freeze drying. Alternatively, the powder can be printed prior to freeze drying. For the purposes of the present discussion a monolith is a free standing unsupported 3-D structure and a coating is a supported 3-D structure on a carrier or film.

A particular advantage of the instant invention is the elimination of the requirement for binder. Binder can be used. However, it serves no useful purpose, adds costs, and results in carbon residue after sintering. If a lubricant or binder is used the lubricant or binder is removed by heating in vacuum, or by washing in aqueous detergents.

To achieve the adequate properties the powder is sintering in vacuum in a sintering furnace at sintering temperatures. Sintering temperatures are preferably about 1,100° C. to about 1,800° C. and typically about 1,250° C. For the purposes of this discussion an anode precursor is after formation of the 3-D structure of the powder and prior to sintering. After sintering the 3-D structure is referred to as an anode.

Valve metals, and particularly tantalum, have a high affinity for oxygen and therefore a sudden exposure of post sintered high surface area anodes to oxygen will result in bulk oxides which are detrimental to electrical properties. This may also result in thermal oxidation, leading to non-uniform native oxide formation and possible run-away oxidation. Subsequent exposure to moisture, water or electrolyte can result in hydrogen embrittlement of the anode wire. It is preferred to utilize controlled exposure of the sintered anode to oxygen over time thereby limiting the oxide formation to the surface. This technique is referred to herein as "passivation" or "progressive step passivation".

Passivation is performed preferably immediately after sintering in a vacuum or inert gas furnace and cooling to a lower temperature than the sintering temperature preferably with initial introduction of less than the stoichiometric amount of oxygen necessary to form native oxide. Formation of the native oxide is exothermic and therefore the amount of oxygen added in each aliquot during passivation is below that amount necessary to raise the temperature of the anode to 60° C. and more preferably, the amount of oxygen in each aliquot is no more than that amount necessary to raise the temperature of the anode to 50° C. As would be realized the amount of oxygen in each aliquot is partially dependent on the temperature prior to the addition of the aliquot with ambient, or near ambient, being preferred for manufacturing efficiency. With each aliquot added the temperature rise as a function of oxygen added decreases and therefore the amount of oxygen can increase per aliquot as the number of aliquots increases. The anodes can be cooled, such as by flowing an inert gas over the anode, between aliquots if desired.

In passivation the amount of oxygen required to stoichiometrically form the native valve metal oxide layer is a function of surface area and is determinate. Typical native surface oxide for Ta, as an example, is equivalent to a dielectric layer formed at 1.167V wherein about 18 angstroms of oxide is formed per volt. Using the surface area of the sintered anode, the total mass of stoichiometric oxygen needed can be calculated, using tantalum for the purposes of discussion, by the following equation:

Weight of O(g)/Weight of Ta(g)=BET($m^2$/g of Ta)× $10^4$($cm^2/m^2$)×1.167V×18 Å/V×$10^{-8}$(cm/Å)×8.2 (density of $Ta_2O_5$ g/$cm^3$)×0.182(g O/g $Ta_2O_5$)× $10^6$ µg O/g O; and dividing this result by BET, which is the surface area, yields the optimum ratio of O (ppm)/BET of 3100 (µg O/$m^2$) or about 0.31 µg/$cm^2$.

Passivation is accomplished using dry air as a medium to provide the required oxygen. The amount of air volume is calculated at standard temperature and pressure (STP) in terms of cubic centimeters at STP (SCC), or Torr, where STP is 25° C. and 1 atmosphere. Passivation is preferably carried out in multiple steps at a temperature not exceeding 60° C. wherein a portion of the total oxygen necessary to achieve stoichiometric native oxygen is introduced at each step. More preferably the passivation temperature does not exceed 50° C. By way of non-limiting example; 10% of the required air volume could be provided in a first step, 20% in a second step, 30% in a third step and the final 40% in a fourth step and therefore by the end of passivation cycle, which is four steps in this example, 100% of the required oxygen is provided. Each step can be followed by a hold time sufficient to allow the temperature to decrease to the extent necessary to ensure a subsequent aliquot of oxygen does not allow the temperature to rise above 60° C. and more preferably not above 50° C. The number of steps in the passivation schedule is not particularly limited, it can vary anywhere from 2 steps to 100 steps with air volume % ranging from 1% to 99% in each step. In some instances, more than a stoichiometric amount of oxygen is added to increase the surface oxide layer with the proviso that the temperature does not exceed the maximum temperature for passivation. It is preferable that no more than 250% of the calculated stoichiometric oxygen be introduced during passivation.

After passivation in air, it is sometimes desirable to further passivate the anode. It is advantageous to use the same sulfuric acid-hydrogen peroxide solution used in leaching to complete the passivation of the anode and wire.

It is preferable to utilize the anode in a capacitor. The anode is anodized to form a dielectric on the surface wherein the dielectric is preferably an oxide of the valve metal. Anodization is well known in the art and the method of anodizing is not particularly limited herein. Other dielectrics could be incorporated without departing from the scope of the invention but oxides of the anode are widely used in the art.

Figure 6:
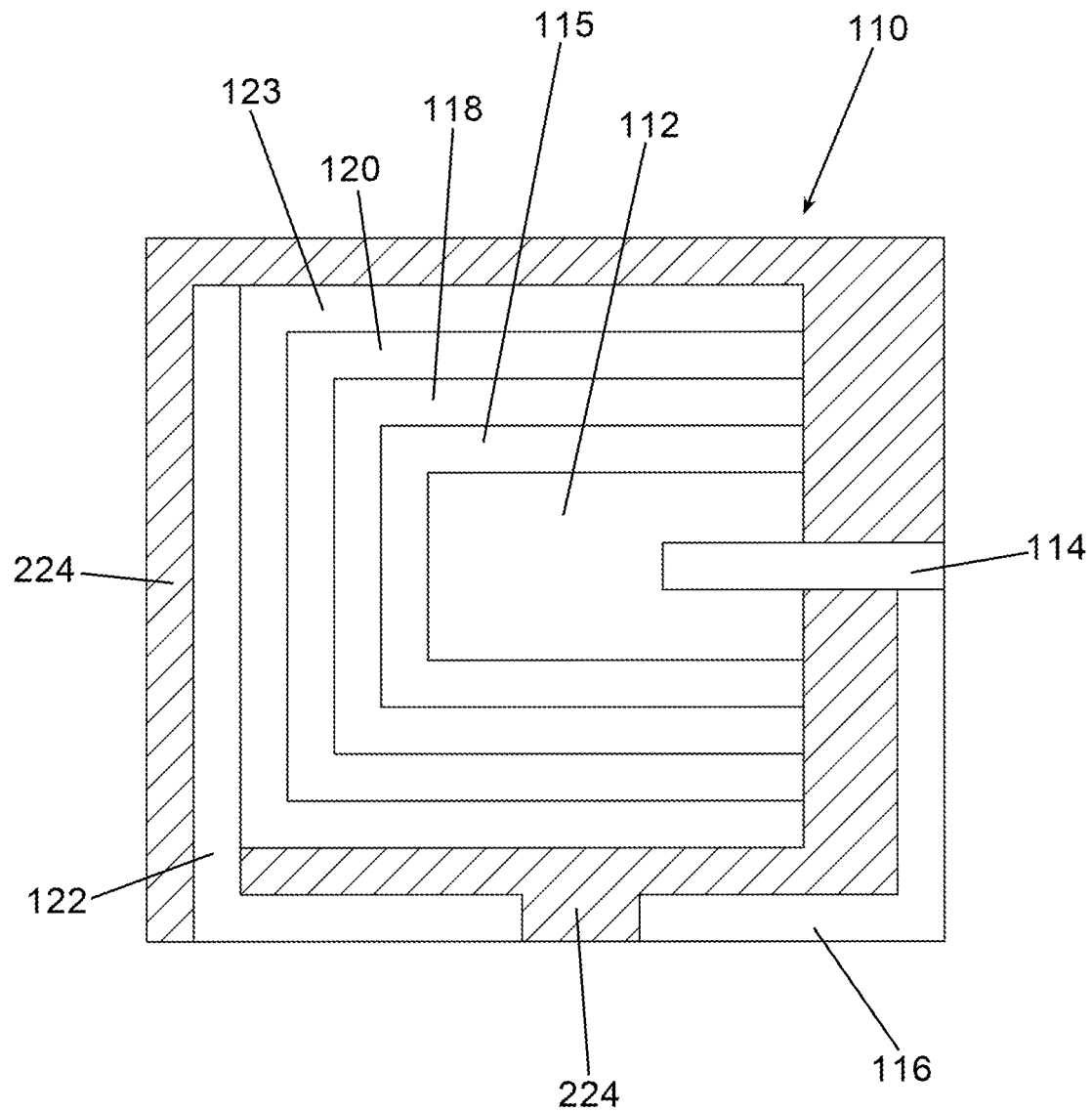
FIG. 6 schematically illustrates an embodiment of the invention.

An embodiment of the invention is illustrated in cross-sectional schematic side view in FIG. 6. In FIG. 6, a capacitor, generally represented at 110, comprises an anodized anode, 112, with an anode lead wire, 114, extending therefrom or attached thereto. The anode lead wire is preferably in electrical contact with an anode lead, 116. An optional, preferably in-situ formed, precursor conductive layer, 115, is formed on the anodized anode and preferably the precursor conductive layer at least partially encases a portion of dielectric of the anodized anode. Alternatively, the precursor conductive layer is formed by coating and curing of a soluble conductive polymer solution. A first conductive polymer layer, 118, and subsequent conductive polymer layer(s), 120, as a cathode layer are formed sequentially on the precursor conductive layer and at least partially encase at least a portion of the first conductive layer and form an encasement around at least a portion of the dielectric. As would be realized to those of skill in the art the cathode and anode are not in direct electrical contact in the finished capacitor. A cathode lead, 122, is in electrical contact with the cathode layers. It is well understood that electrically connecting a lead frame, or external termination, to a polymeric cathode is difficult. It has therefore become standard in the art to provide conductive interlayers, 123, which allow good electrical and mechanical adhesion to the lead frame. In many embodiments it is preferred to encase the capacitor in a non-conductive resin, 224, with at least a portion of the anode lead and cathode lead exposed for attachment to a circuit board as would be readily understood by one of skill in the art.

A cathode layer is formed on the dielectric. The cathode is a conductive layer and may be formed from conductive polymers, such as conductive thiophenes, with polyethylenedioxythiophene derivatives being exemplary for use in the demonstration of the invention. Other cathode layers, such as manganese dioxide, which is a conductive semiconductor, are suitable for use in demonstration of the invention.

It is widely understood that external terminations are difficult to form on the cathode, particularly with a conductive polymeric cathode, and therefore the conductive interlayers are typically applied to the cathode layer to facilitate termination. In particular, carbon layers overcoated with metal layers, such as silver or nickel, are suitable for demonstration of the invention. The capacitor is typically finished. Finishing may include attachment of external terminations, encapsulating in an insulator, testing, packaging and the like.

The anode wire preferably comprises a valve metal and most preferable niobium or tantalum due to the advantages provided by the use of magnesium as a reducing agent with these valve metals. Other valve metals can be used with the proviso that a reducing agent having a higher oxygen affinity than the valve metal will be required. Tantalum is preferred as the anode and most preferably doped tantalum is preferred. It is preferable that the tantalum of the anode wire be doped. Particularly suitable dopants include Yttrium (Y), Silicon (Si), Cerium (Ce), Carbon (C), Germanium (Ge), Palladium (Pd), Platinum (Pt), Rhenium (Rh), Molybdenum (Mo), Lanthanum (La), Neodymium (Nd), Thallium (Th) and others.

Examples

The valve metal powder described herein is particularly suited for use as the anode in a capacitor. The valve metal is preferably oxidized to form a dielectric and the dielectric is over coated with a conductor as well known in the art.

To form the powder Ta primary particles, referred to as a basic lot, are suspended in water or another liquid to make a slurry. The slurry is frozen in the desired shape having the desired dimension. By cooling the slurry directionally the water/liquid freezes along certain crystallographic directions resulting in primary, secondary, tertiary, etc. dendrites. The powder particles get frozen in and/or on the surfaces of these dendrites. Directional freezing of these structures, by a cold plate or finger, results in primary dendrites which are perpendicular to the freezing surface and secondary dendrites which are typically parallel to the plate extending from the primary dendrites. Freeze drying of this frozen structure results in a 3D porous structure, or monolith, with different pore size distribution due to the presence of the dendritic pores corresponding to the removed dendrites, with typically bigger pores perpendicular to the freezing surface. The pore sizes and distribution can be tailored by controlling the primary particle size, the % solid in slurry, slurry liquid, slurry and cold plate temperatures and freezing rate among other parameters. The porous structure thus obtained is then sintered and regular valve metal capacitor production process is used for producing a capacitor. The bigger perpendicular pores will allow easier impregnation resulting in better CAP recovery and lower ESR. This will also allow production of thinner anodes.

Figure 7:
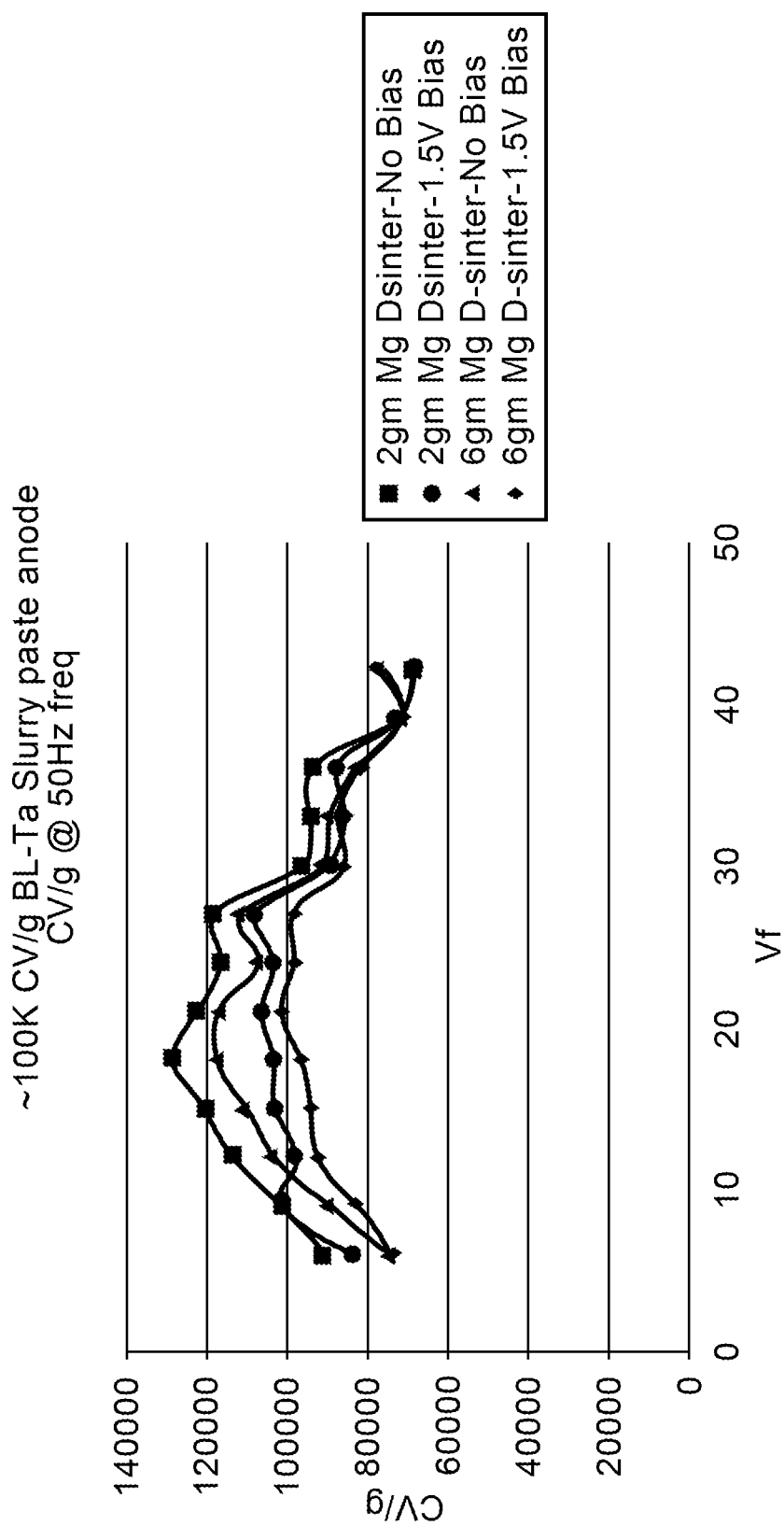
FIGS. 7-10 graphically illustrate the advantages of the invention.

The data present in Table 1 illustrates that the powder surface area is reduced by half as the powder advances through the typical process from semi-finished, before thermal agglomeration, to the finished stage. Surface area is further reduced by another half when the finished powder is used to make an anode in a traditional vacuum sintering process. In total, approximately 75% of the surface area is lost from semi-finished stage to sintered anode stage based on a typical 150K CV/g tantalum flake. To retain incoming surface area in a sintered anode, such as in a 100K CV/g nodular powder, semi-finished powder lot made into slurry/paste with 4.0 g/in$^3$ suitable for pressing, is directly used to press anodes and sintered using Mg deoxygenated process for eliminating impurities and solid state sintering. The result is a reduction in surface area of only 15% which resembles a 180K CV/g nodular sintered anode surface area. The actual CV/g at different formation voltages is shown in FIG. 7. The results presented graphically in FIG. 7 are a wet CV/g for Ta water slurry anodes made from ~100K CV/g basic lot, Mg deoxygenated sintered, formed at 6 Vf to 42 Vf @80° C. in potassium phosphate+polyethylene glycol electrolyte.

TABLE 1

| | Basic lot/Semi-finished | Finished powder lot | Typical sintered anode |
|---|---|---|---|
| ~180K CV/g nodular | — | 4.6 m2/g | 1.74 m2/g (Std Vacuum sinter) 2.08 m2/g (Mg deox sintering) |
| ~150K CV/g flake | 7.2 m2/g | 3.2 m2/g | 1.68 m2/g (Std Vacuum sinter) |
| ~100K CV/g nodular | 2.2 m2/g | N/A | 1.87 m2/g (Mg deox sintering BL) |

Figure 8:
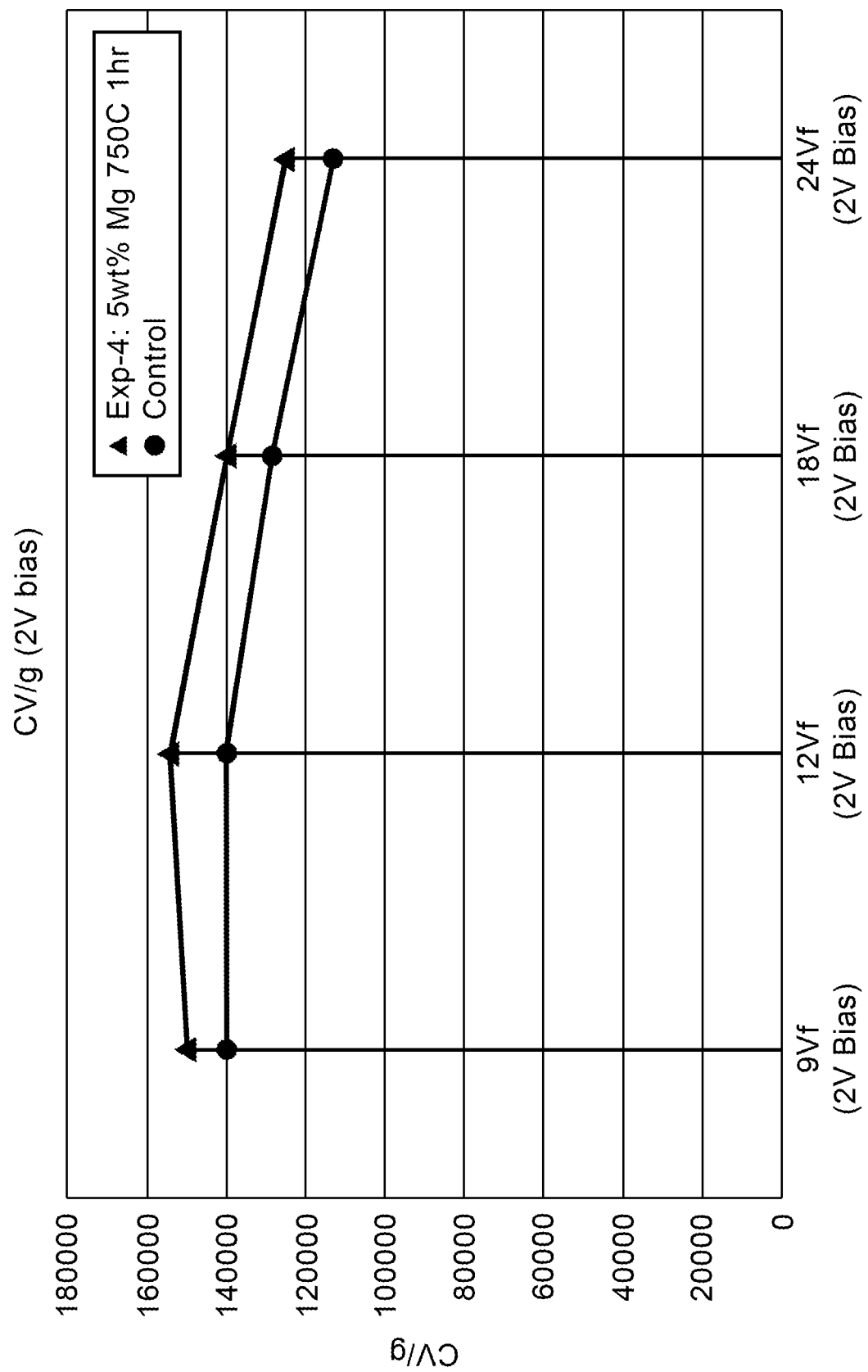

FIG. 8, is an example of retaining surface area from a commercially available finished lot powder. In this case, commercially available finished ~180K CV/g Ta powder with a surface area of ~4.6 m$^2$/g is used to form pressed anodes. Some of these pressed anodes are then sintered in traditional vacuum sintering, as a control and some anodes are sintered through Mg Deox process (Exp-4). For one of the optimized conditions, Mg Deoxygenated anode process showed approximately 10% higher CV/g (wet conditions) than the traditional sintered anodes in a typical anodization conditions for this charge level. The same is observed in terms of surface area in post sintered anodes versus a control with 1.74 m$^2$/g, Mg Deoxygenated with 2.08 m$^2$/g wherein the surface area is provided in the ~180K CV/g sample of Table 1. Wet CV/g of a commercially available powder sintered in a typical vacuum sinter process, control, and Mg Deoxygenated sinter process (Exp-4) demonstrates an approximately 10% higher CV/g.

Figure 11:
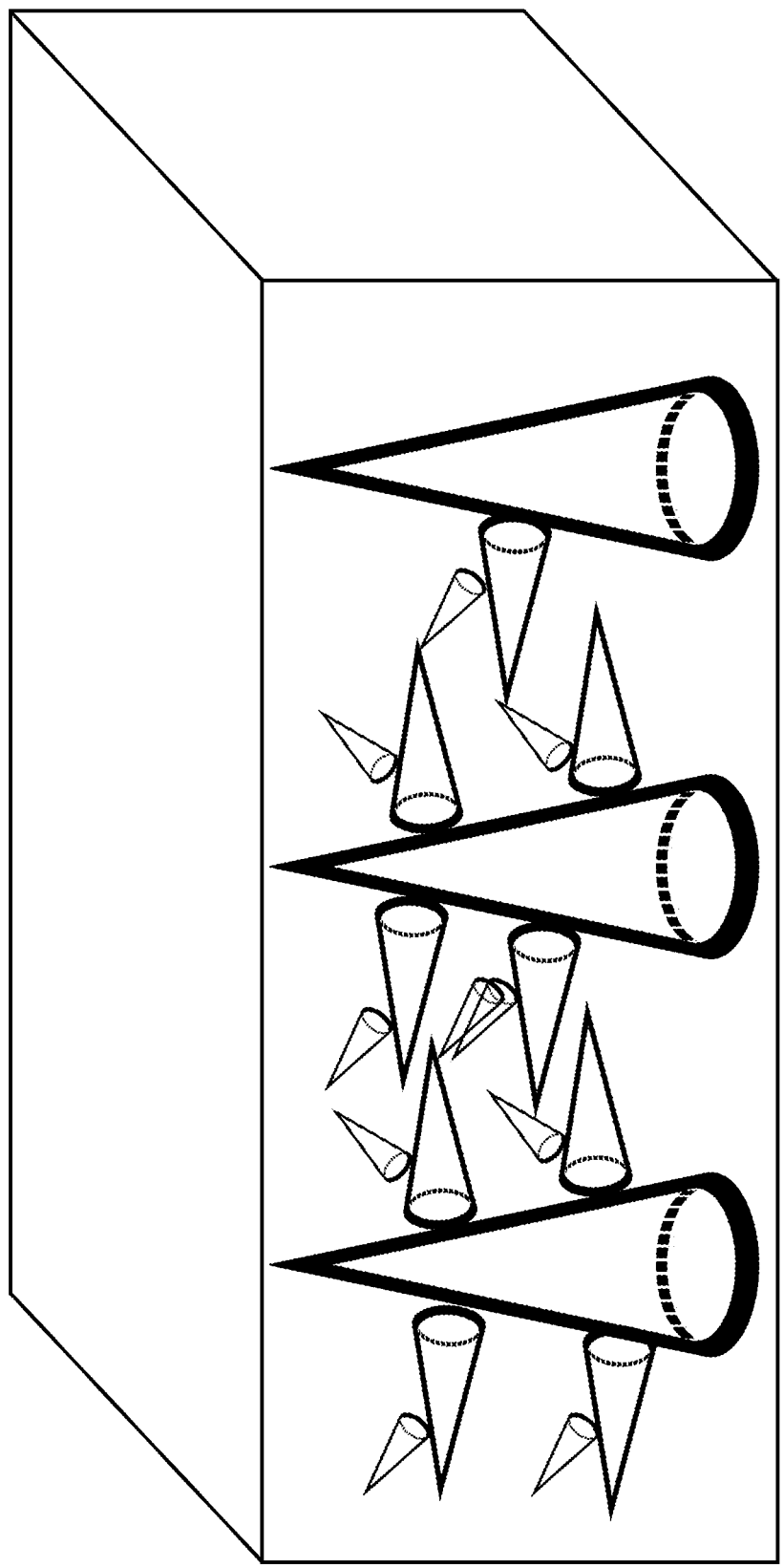
FIG. 11 schematically illustrates dendritic pores.

Tantalum capacitor anodes require a mixture of small and large pores for efficient impregnation. The problem of only having small pores in the structure is solved by freezing a water slurry of tantalum powder and freeze drying it. Freezing a water slurry of tantalum powder produces dendritic structures, which when freeze dried, leaves a 3D porous structure with large pores perpendicular to the freezing surface as replicas of the dendrite structure. Freeze drying removes the ice dendrites without disturbing the structure resulting in dendritic pores within the anode body as illustrated schematically in FIG. 11.

Figure 9:
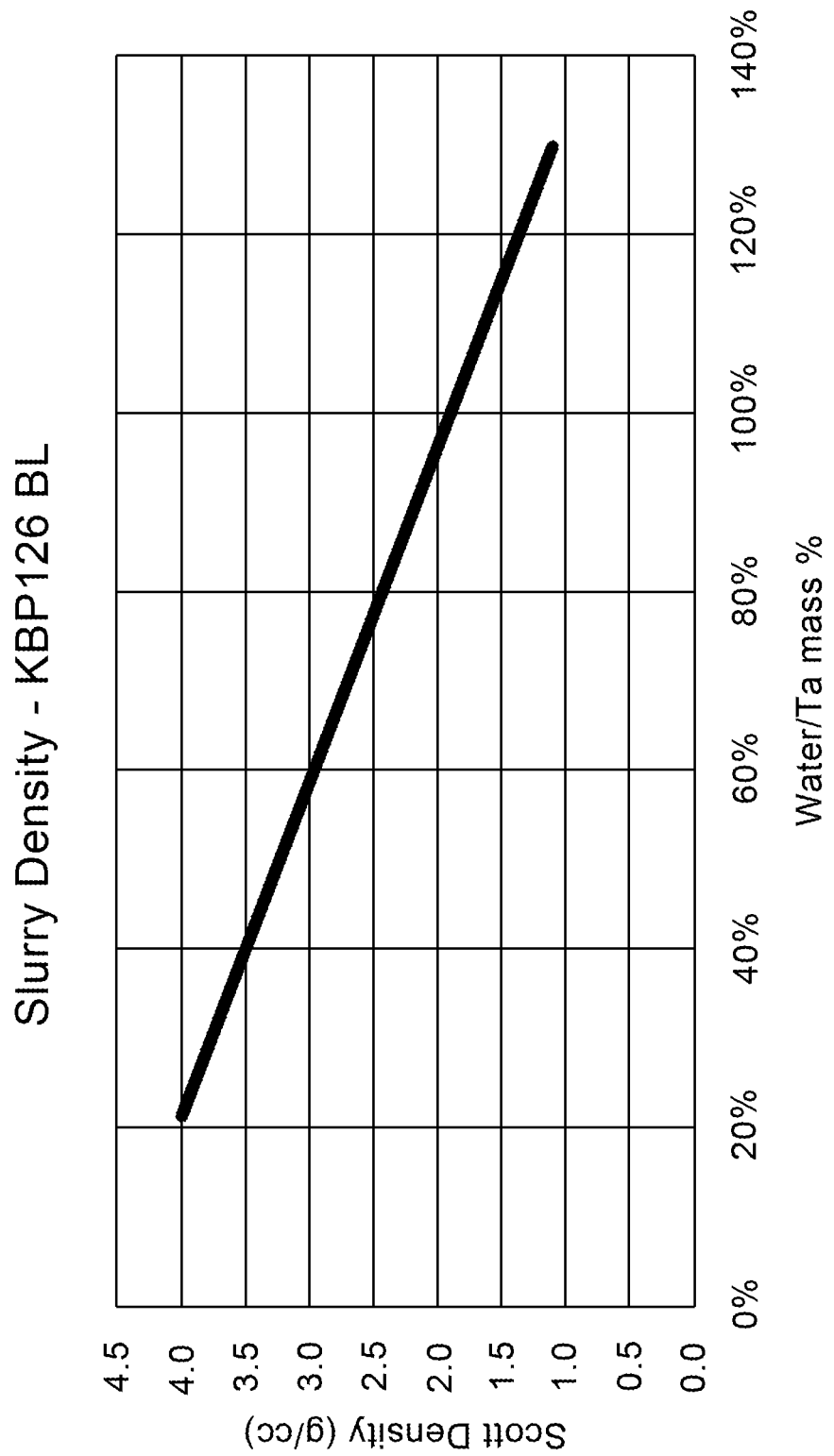

FIG. 9 graphically illustrates the Scott Density (g/cc) of a slurry as a function of water/tantalum mass %. The graph illustrates the nearly linear nature of the Scott Density as a function of water content in the slurry when dense aggregates are formed as described herein.

Figure 10:
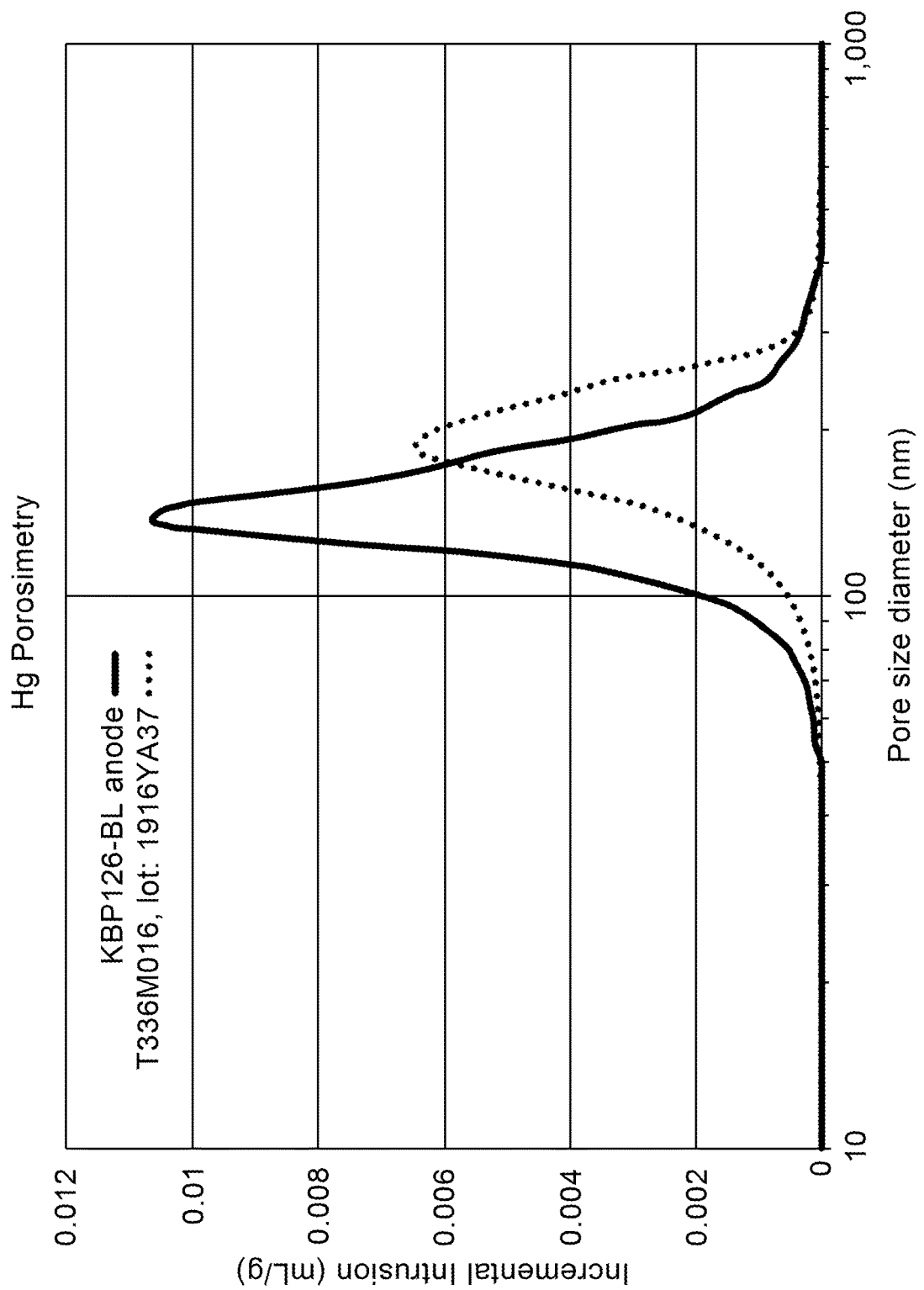

FIG. 10 graphically illustrates the Hg porosity, or incremental inclusion of Mg (ml/g) for an experimental anode referred to as KBP116-BL versus a control referred to as T336M016. The control anode utilized a finished lot powder with 2% binder, commercially available QPAC, at a press density of 6.5 g/cc and a BET surface area of 1.37 m$^2$/g.

The invention has been described with reference to the preferred embodiments without limit thereto. Additional embodiments and improvements may be realized which are not specifically set forth herein but which are within the scope of the invention as more specifically set forth in the claims appended hereto.

The invention claimed is:

1. A process for forming an anode comprising:
   forming a dense aggregate comprising a powder and solvent in a pendular, funicular or capillary state;
   forming said dense aggregate into an anode shape;
   drying said anode shape to form an anode precursor; and
   sintering said anode precursor to form the anode.

2. The process for forming an anode of claim 1 wherein said powder is tantalum.

3. The process for forming an anode of claim 1 wherein said drying is vacuum drying.

4. The process for forming an anode of claim 3 wherein said drying is freeze drying.

5. The process for forming an anode of claim 4 further comprising directional freezing prior to said freeze drying.

6. The process for forming an anode of claim 1 wherein said dense aggregate has a density of at least 4 g/cc.

7. The process for forming an anode of claim 1 wherein said anode has a density of 6.5-7.5 g/cc.

8. The process for forming an anode of claim 1 wherein said dense aggregate is formed by adding said solvent to a powder with sheer.

9. The process for forming an anode of claim 1 further comprising attaching an anode wire to said anode precursor.

10. The process for forming an anode of claim 9 wherein said attaching is selected from welding and embedding.

11. The process for forming an anode of claim 1 wherein said forming comprises printing or pressing.

12. The process for forming an anode of claim 1 further comprising deoxygenation.

13. The process for forming an anode of claim 12 wherein said deoxygenation comprises a reaction with magnesium.

14. The process for forming an anode of claim 1 further comprising passivation.

15. The process for forming an anode of claim 1 further comprising isolating said powder by particle size prior to said forming into said anode shape.

16. The process for forming an anode of claim 1 wherein said freeze drying forms dendritic voids.

17. The process for forming an anode of claim 16 wherein said dendritic voids comprise primary dendritic voids.

18. The process for forming an anode of claim 17 wherein said dendritic voids comprise secondary dendritic voids.

19. The process for forming an anode of claim 1 wherein said anode shape is a 3-D shape.

20. The process for forming an anode of claim 19 wherein said 3-D shape is selected from a monolith and a coating.

21. A process for forming an anode comprising:
   forming a dense aggregate comprising a powder and solvent in a pendular, funicular or capillary state;
   freeze drying said dense aggregate to form a dried powder;
   forming said dried powder into an anode shape; and
   sintering said anode shape to form the anode.

22. The process for forming an anode of claim 21 wherein said powder is tantalum.

23. The process for forming an anode of claim 21 further comprising directional freezing prior to said freeze drying.

24. The process for forming an anode of claim 21 wherein said dense aggregate is formed by adding said solvent to a powder with sheer.

25. The process for forming an anode of claim 21 wherein said dense aggregate has a density of at least 4 g/cc.

26. The process for forming an anode of claim 21 wherein said anode has a density of 6.5-7.5 g/cc.

27. The process for forming an anode of claim 21 further comprising attaching an anode wire to said anode precursor.

28. The process for forming an anode of claim 27 wherein said attaching is selected from welding and embedding.

29. The process for forming an anode of claim 21 wherein said forming comprises printing or pressing.

30. The process for forming an anode of claim 21 further comprising deoxygenation.

31. The process for forming an anode of claim 30 wherein said deoxygenation comprises a reaction with magnesium.

32. The process for forming an anode of claim 21 further comprising passivation.

33. The process for forming an anode of claim 21 further comprising isolating said powder by particle size prior to said forming into said anode shape.

34. The process for forming an anode of claim 21 wherein said freeze drying forms dendritic voids.

35. The process for forming an anode of claim 34 wherein said dendritic voids comprise primary dendritic voids.

36. The process for forming an anode of claim 35 wherein said dendritic voids comprise secondary dendritic voids.

37. The process for forming an anode of claim 21 wherein said anode shape is a 3-D shape.

38. The process for forming an anode of claim 37 wherein said 3-D shape is selected from a monolith and a coating.

39. A process for forming an anode comprising:
providing a basic lot powder having a density of 0.7 to 1 g/cc;
converting said basic lot powder to a dense aggregate comprising a powder and solvent in a pendular, funicular or capillary state having a density of at least 4 g/cc;
forming said dense aggregate into an anode shape;
drying said anode shape to form an anode precursor; and
sintering said anode precursor to form the anode having a density of 6.5 to 7.5 g/cc.

40. The process for forming an anode of claim 39 wherein said powder is tantalum.

41. The process for forming an anode of claim 39 wherein said drying is vacuum drying.

42. The process for forming an anode of claim 41 wherein said drying is freeze drying.

43. The process for forming an anode of claim 42 further comprising directional freezing prior to said freeze drying.

44. The process for forming an anode of claim 39 wherein said dense aggregate is formed by adding said solvent to a powder with sheer.

45. The process for forming an anode of claim 39 further comprising attaching an anode wire to said anode precursor.

46. The process for forming an anode of claim 45 wherein said attaching is selected from welding and embedding.

47. The process for forming an anode of claim 39 wherein said forming comprises printing or pressing.

48. The process for forming an anode of claim 39 further comprising deoxygenation.

49. The process for forming an anode of claim 48 wherein said deoxygenation comprises a reaction with magnesium.

50. The process for forming an anode of claim 39 further comprising passivation.

51. The process for forming an anode of claim 39 further comprising isolating said powder by particle size prior to said forming into said anode shape.

52. The process for forming an anode of claim 39 wherein said freeze drying forms dendritic voids.

53. The process for forming an anode of claim 52 wherein said dendritic voids comprise primary dendritic voids.

54. The process for forming an anode of claim 53 wherein said dendritic voids comprise secondary dendritic voids.

55. The process for forming an anode of claim 39 wherein said anode shape is a 3-D shape.

56. The process for forming an anode of claim 55 wherein said 3-D shape is selected from a monolith and a coating.

* * * * *